No. 630,029. Patented Aug. 1, 1899.
F. BURGER.
REVOLVING PISTON MOTOR WHEEL.
(Application filed Dec. 15, 1897.)
(No Model.) 2 Sheets—Sheet 1.
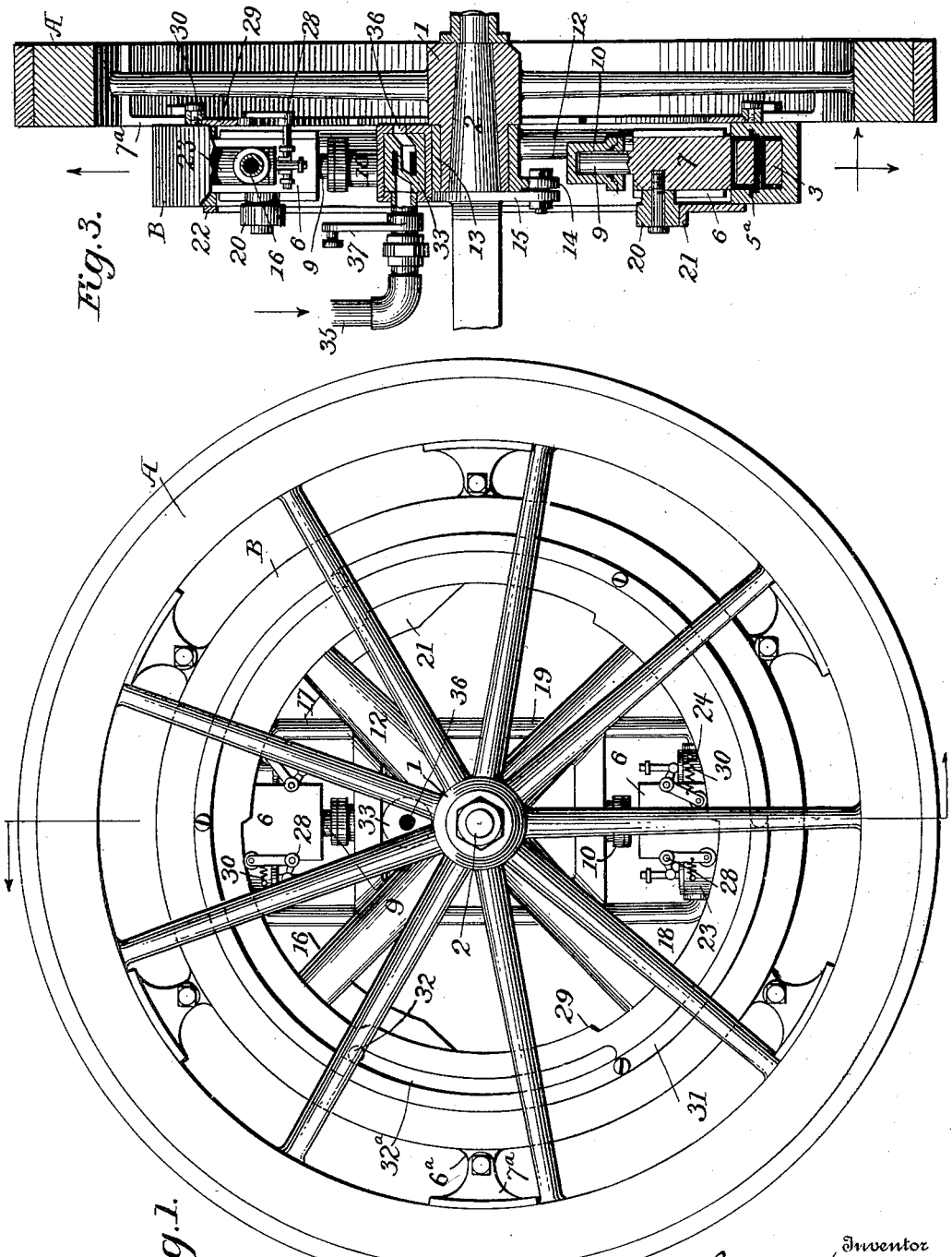

No. 630,029. Patented Aug. 1, 1899.
F. BURGER.
REVOLVING PISTON MOTOR WHEEL.
(Application filed Dec. 15, 1897.)
(No Model.) 2 Sheets—Sheet 2.
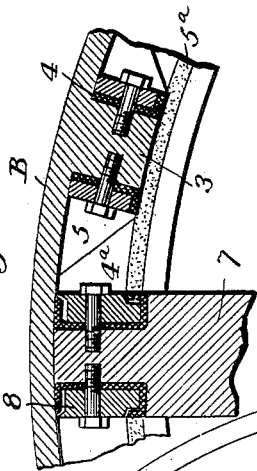
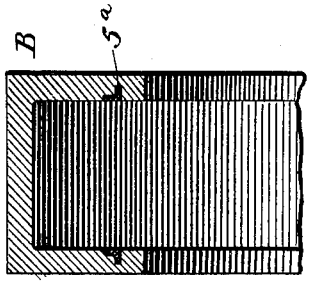
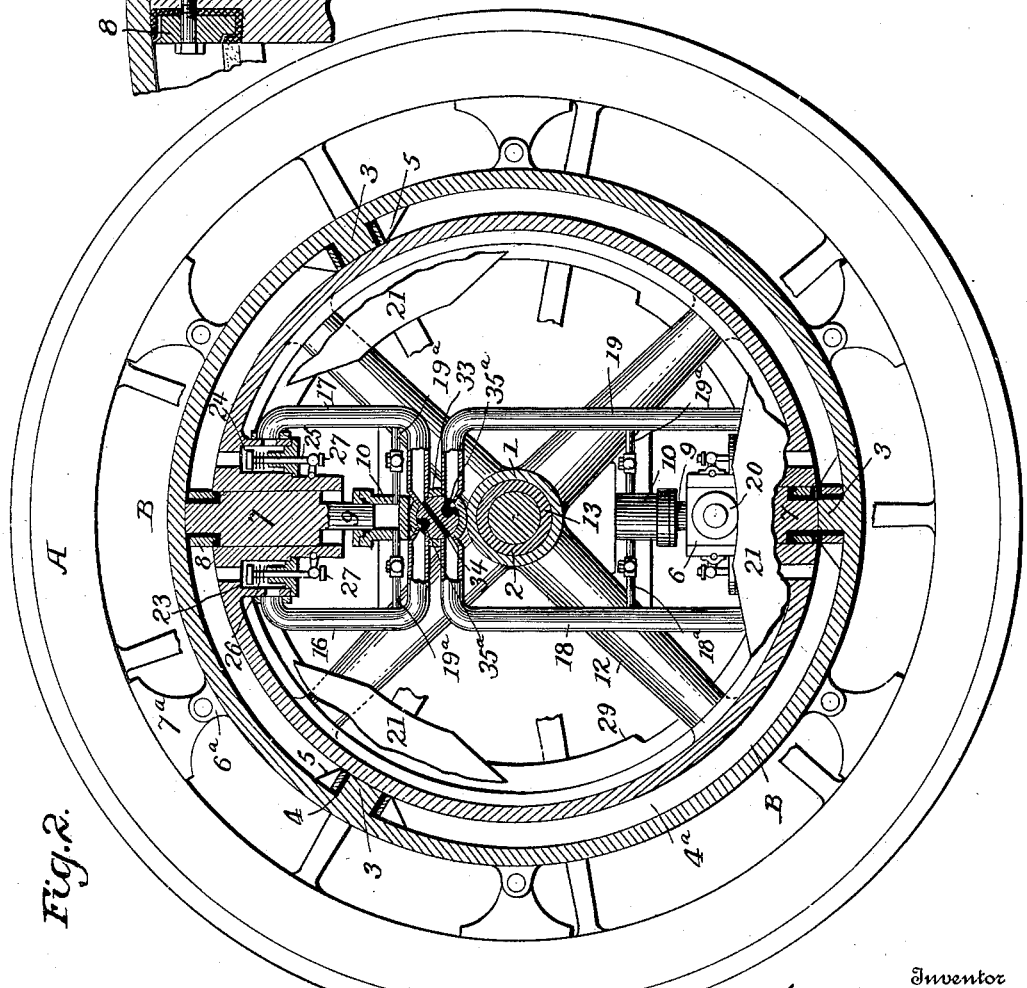
Inventor
Franz Burger
by Foster Freeman
Attorneys
Witnesses

UNITED STATES PATENT OFFICE.

FRANZ BURGER, OF FORT WAYNE, INDIANA, ASSIGNOR OF THREE-FOURTHS TO HENRY M. WILLIAMS, OF SAME PLACE.

REVOLVING-PISTON MOTOR-WHEEL.

SPECIFICATION forming part of Letters Patent No. 630,029, dated August 1, 1899.

Application filed December 15, 1897. Serial No. 662,009. (No model.)

*To all whom it may concern:*

Be it known that I, FRANZ BURGER, a citizen of the United States, residing at Fort Wayne, in the county of Allen and State of Indiana, have invented certain new and useful Improvements in Revolving-Piston Motor-Wheels, of which the following is a specification.

This invention relates to certain new and useful improvements in combined traction-wheels and revolving-piston motors, having for its object to provide a wheel and a simple and efficient motor connected to drive the same, which wheel and motor may be secured to the axle of any ordinary vehicle or used in connection with various forms of conveyances—such as locomotives, street-cars, omnibuses, delivery-wagons, &c.—to propel the same.

With this object in view the invention consists in the novel construction and arrangement of the parts hereinafter more particularly described.

In the accompanying drawings, forming a part of this specification and in which like letters and figures of reference indicate corresponding parts, Figure 1 is a side elevation of the improved wheel and driving-motor. Fig. 2 is a sectional view of the same. Fig. 3 is a transverse sectional view thereof, and Figs. 4 and 5 are detail sectional views.

Referring more particularly to the drawings, A designates a wheel of any desired construction and made of any suitable material or combination of materials. In the present embodiment of the invention the wheel is similarly constructed to the ordinary locomotive or wagon wheel, being provided with the usual felly, tire, spokes, and hub, the hub 1 being preferably formed of metal and mounted to rotate upon a stationary axle 2.

Fixedly mounted upon the wheel A, at one side thereof, is an internally-channeled revolving ring B, the channel of said ring having its sides at right angles to each other, two of the sides being parallel, and formed in the channel at equidistant points are two or more transverse solid walls 3, three being shown in the present instance. These walls constitute the pistons of the engine, and they are provided upon opposite sides with suitable packings 4 and with oppositely-inclined surfaces 5, the purpose of which will presently appear. As shown, the revolving ring is of less diameter than the felly of the wheel, and it is secured thereto by means of bolts which pass through earpieces 6 of the ring and equidistantly-spaced inwardly-extending flanges 7 of the felly.

Extending into the channel of the revolving ring and resting in close contact with the sides thereof and with the faces of the abutments 3 is a stationary ring C. When thus arranged, three segmental expansion-chambers 4ª are formed between the two rings B C, into which the motive fluid—such as steam, compressed air, &c., preferably the latter—is introduced to drive the engine. Suitable packings 5ª are interposed between the stationary ring C and the side flanges of the revolving ring to avoid the escape of the motive fluid from the expansion-chambers 4. The stationary ring C is supported upon radial arms 12, extending from a central sleeve 13, mounted upon an extension of the hub, but maintained against turning therewith by means of a lug 14, extending from the sleeve and bolted to a flange 15 of the axle 2.

Adapted to reciprocate in guides 6, arranged at diametrically opposite points on the stationary ring, are abutments 7, provided at their outer ends with suitable packings 8, the said ends being adapted to enter the expansion-chambers 4ª at predetermined intervals and form a solid non-yielding bridge across the same. At their inner ends the abutments are provided with extensions 9, which project into cylinders 10, likewise carried upon the stationary ring, to constitute pistons. Leading into one of the cylinders 10 from pipes 16 17, respectively, and into the other from pipes 18 19 are the branch pipes 18ª 19ª, which constitute the supply and exhaust passages of said cylinders. It will be obvious from this that if motor fluid is introduced into the cylinders 10 under the pistons 9 the abutments 7 will be forced outward into the channel of the revoluble ring B and divide the expansion-chambers 4 into two chambers. Therefore when steam or air is admitted into the channel it will expand between the abutments 7 and the next adjacent wall or piston 3, causing the ring B, and consequently its attached wheel A, to be rotated in one direction or the other, depending upon which side of the abutment the motive fluid is introduced.

It will be obvious that if the abutments 7 are permitted to remain within the channel of the ring B upon the continued rotation of the said ring an advancing piston 3 thereof would be brought into forcible contact with the abutment, resulting in the breakdown of the motor. In order to prevent this, each abutment is provided at one side with a friction-roller 20, which is adapted to be engaged by cams 21 of a ring 22, carried at one side of the revoluble ring B. These cams 21 are arranged opposite each piston 3 and are adapted to engage the friction-rollers 20 of the abutments 7 upon the close approach of the pistons thereto to withdraw the abutments from the channel of the ring B and maintain them in such positions until after a piston has passed the abutments, after which they are again projected into the channel in the manner above described.

Upon opposite sides of each abutment are valve-chambers 23 24, which open into the channel of the revoluble ring B and are connected, respectively, with the pipes 16 17. Within each of the valve-chambers is a valve 25, adapted to be held against its seat by means of a spring 26 and having its stem projecting through the valve-casing and provided with a bearing 27. This bearing is adapted to be engaged by a short arm of a bell-crank lever 28, pivoted at its angle upon the stationary frame and having its opposite end provided with a friction-roller, which is held in contact with a cam-ring 29 by means of a spring 30. This cam-ring is held between one side of the revolving ring B and a retaining-ring 31, screwed to the ring B, and is adapted to be shifted between said rings a predetermined distance, this movement being limited by means of a stop 32, projecting through a segmental slot 32ª in the cam-ring. The purpose of this will presently appear.

Intersecting the passages of the pipes 16 17 18 19 is a starting and reversing valve 33, formed with a central inlet-passage 34, which communicates with a supply-pipe 35 and with two other passages 35ª, which communicate with a common exhaust-port 36.

Assuming the parts to be in the positions shown in Figs. 1 and 2, it will be noted that a piston 4 has just passed the upper abutment 7, which has been projected into the channel of the revoluble ring B. At this time the cam-ring has swung the upper right-hand bell-crank lever 28 to the right, causing its short arm to engage with the bearing 27 and open the valve 25 of the chamber 24, thus permitting the motor fluid to pass into the channel of the ring B and expand between the solid abutment and the piston 3 to rotate the said piston and ring B. While this is taking place the expanded motive fluid contained between the upper abutment and the approaching piston is compressed and forces open the valve of the chamber 23, permitting the fluid to escape through the exhaust-pipe 16 and port 36. The lower abutment 7, as shown, has been retracted from the channel of the ring B by means of the engagement with its roller of one of the cams 21 of the ring 22, thereby permitting the free passage of a piston 3. When this piston has passed, however, the abutment is quickly projected into the ring-channel by means of the motor fluid entering the cylinder 10 through pipes 18 18ª and acting upon the piston 9. The valve of the chamber 24 is then opened and motive fluid is introduced intermediate the said lower abutment and the piston which has just passed said abutment. It will thus be seen that motive fluid is always being admitted between a piston and one of the abutments, and the engine is never required to run by momentum. Moreover, it will be noted that all of the parts of the wheel and motor are equally balanced upon the axle, and therefore there is little liability of uneven operation of the engine or of the parts becoming worn or loosened.

In event of any one of the cams 21 failing to retract one of the abutments 7 it will be obvious that as a piston approaches the abutment it will be engaged and caused to ride upon the inclined surface 5 of the piston and forced out of the channel of the ring B.

When it is desired to reverse the motor, the reversing-valve 33 is turned by means of a lever 37 to place the pipes 16 19 into communication with the supply-pipe 35 and the pipes 17 18 into communication with the exhaust-port. The valves of the chambers 23 thereupon become the inlet-valves, while those of the chambers 24 become the exhaust-valves. When, however, the engine is reversed, it becomes necessary to shift the cam-ring 29 in order that the valves will be operated at the proper times. This is effected in the following manner: Assuming that the motor is operating to rotate the wheel A toward the right and it is desired to reverse it, the reversing-valve is turned to place the pipes 16 19 into communication with the supply-pipe. The revoluble ring B then begins to rotate toward the left. This movement brings shoulders $x$ of the cam-ring 29 into contact with the arms of the bell-crank levers 28, which, being inclined in the opposite direction to that in which said ring is being moved, hold the ring against movement with the ring B until the stop 32 has traveled from one end of the slot 32ª to the other, when the cam-ring will be positively rotated with the ring B, and the arms of the levers 28, being no longer able to resist the rotation of the cam-ring, will ride upon the shoulders and over the surface thereof, and the engine will continue its operation, the cam-ring then being in a position to properly actuate the inlet-valves.

Without limiting myself to the exact construction and arrangement of the parts shown and described, since it will be obvious that various changes in such construction and arrangement may be made without departing from the spirit or scope of my invention,

What I claim is—

1. The combination with a wheel, of a motor comprising a revolving channeled ring provided in its channel with one or more pistons and connected directly to the wheel, a stationary ring adapted to close the mouth of the channel of the revolving ring, one or more reciprocating abutments adapted to enter the channel, means for reciprocating said abutments, inlet and exhaust ports communicating with the channel, valves for said ports, and a cam-ring carried by the revolving ring for operating the inlet-valves, substantially as described.

2. The combination with a wheel, of a motor, comprising a revolving channeled ring provided in its channel with one or more pistons and connected directly to the wheel, a stationary ring adapted to close the mouth of the channel of the revolving ring, one or more reciprocating abutments adapted to enter the channel, means for reciprocating said abutments, inlet and exhaust ports communicating with the channel, valves for said ports, and means carried by the revolving ring for operating the inlet-valves, substantially as described.

3. The combination with a wheel, of a motor comprising a revolving channeled ring provided in its channel with one or more pistons and connected directly to the wheel, a stationary ring adapted to close the mouth of the channel of the revolving ring to form expansion-chambers between the pistons thereof, one or more reciprocating abutments adapted to be projected into the channel of the revolving ring, means carried upon said ring for operating the abutments, inlet and outlet ports communicating with the channel, valves for said ports, and means for operating the valves, substantially as described.

4. The combination with a wheel, of a motor comprising a revolving channeled ring provided in its channel with one or more pistons and connected directly to the wheel, a stationary ring adapted to close the mouth of the channel of the revolving ring, one or more reciprocating abutments adapted to enter the channel, means for reciprocating said abutments, inlet and exhaust ports communicating with the channel, valves for said ports, bell-crank levers connected to operate said valves, and a cam-ring carried upon the revolving ring and adapted to engage arms of the bell-crank levers to operate the same, substantially as described.

5. The combination with a wheel, of a motor comprising a revolving channeled ring provided in its channel with one or more pistons and connected directly to the wheel, a stationary ring adapted to close the mouth of the channel of the revolving ring, one or more reciprocating abutments adapted to enter the channel, means for reciprocating said abutments, inlet and exhaust ports communicating with the channel, valves for said ports, and a self-shifting cam-ring carried upon the revolving ring for operating the inlet-valves, substantially as described.

In testimony whereof I have signed my name to this specification in the presence of two subscribing witnesses.

FRANZ BURGER.

Witnesses:
   GEO. D. CRANE,
   H. W. NIRWONGER.